Patented Oct. 3, 1939

2,174,791

UNITED STATES PATENT OFFICE 2,174,791

DRILL BIT

John Kruttschnitt, San Mateo, Calif.

Application November 8, 1937, Serial No. 173,376

3 Claims. (Cl. 255—64)

The present invention relates to drill bits of the type commonly used with compressed air hammers for rock drilling.

The principal objects of the invention are to provide a bit having superior cutting speed, which cuts a smooth and true cylindrical hole, which clears its cutting face easily of chips, and which can be re-sharpened readily without special equipment. Other objects and advantages of the invention will become apparent from the following specification, which should be read with the understanding that changes, within the limits of the appended claims, may be made in the form and construction of the device as herein shown, without departing from the spirit of the invention.

Reference will be made to the accompanying drawing, wherein:

Fig. 1 is a part-sectional side elevation of a drill bit representing a preferred embodiment of the invention.

Fig. 2 is a side elevation of the same bit turned through 90 degrees.

Fig. 3 is an end view showing the cutting face.

Fig. 4 is a diagram showing the pattern cut by the bit in the bottom of the hole.

In the drawing the reference numeral 11 designates the body of the bit, which is preferably, but not necessarily, circular in cross section, and has a slight taper to provide clearance for chips, the cutting end (shown at the bottom in Figs. 1 and 2) being slightly larger than the shank end. The bit may be formed integrally with a suitable stem or shank, but I prefer to provide it with an interior thread 12 by which it is removably secured upon the end of a separate shank 13.

The cutting end of the bit is provided with two cutting faces preferably formed upon raised ridges 14 and 15, the face 14 being approximately straight and extending across the end of the bit at a point between its center and one side, and the face 15 being curved with its convex side toward the straight face 14, and its apex 16, that is to say the mid-point of said convex side, approximately coinciding with the center of the end of the bit. The ends of both faces extend out to the sides of the bit as shown.

A groove 17 preferably separates the two faces or ridges 14 and 15, and because of the curvature of the ridge 15, said groove has enlarged flaring ends 18. A central passage 19 for scavenging and cooling fluid (air or water as the conditions of use may require) extends longitudinally through the bit, communicating with a similar passage in the shank, and terminating in the groove 17, preferably through branched discharge apertures 20 opening on either side of the center. The groove 17 thus serves as the principal scavenging channel through which chips are carried off to the outside of the bit.

The outer periphery of the bit is cut away on the outside of the straight face 14, as shown at 21, and also within the outer or concave side of the curved face 15, as shown at 22. These cut away portions assist in carrying off chips.

The faces 14 and 15 are preferably formed with cutting teeth 23 and 24 respectively, of V-shape. The angle at the cutting edges of said teeth may be varied to suit different kinds of material worked upon, but I prefer to make them 80 degrees, as shown, for general hard rock work.

The teeth 23 of the straight face 14 are preferably cut transversely, i. e., at right angles to the longitudinal axis of said face, and the teeth 24 of the curved face 15 are preferably aligned with the teeth 23 of the straight face, so that both sets of teeth can be sharpened simultaneously by moving a V-shaped grinding wheel in straight parallel lines across the bit. The teeth can also be sharpened by hand, by filing straight across both faces.

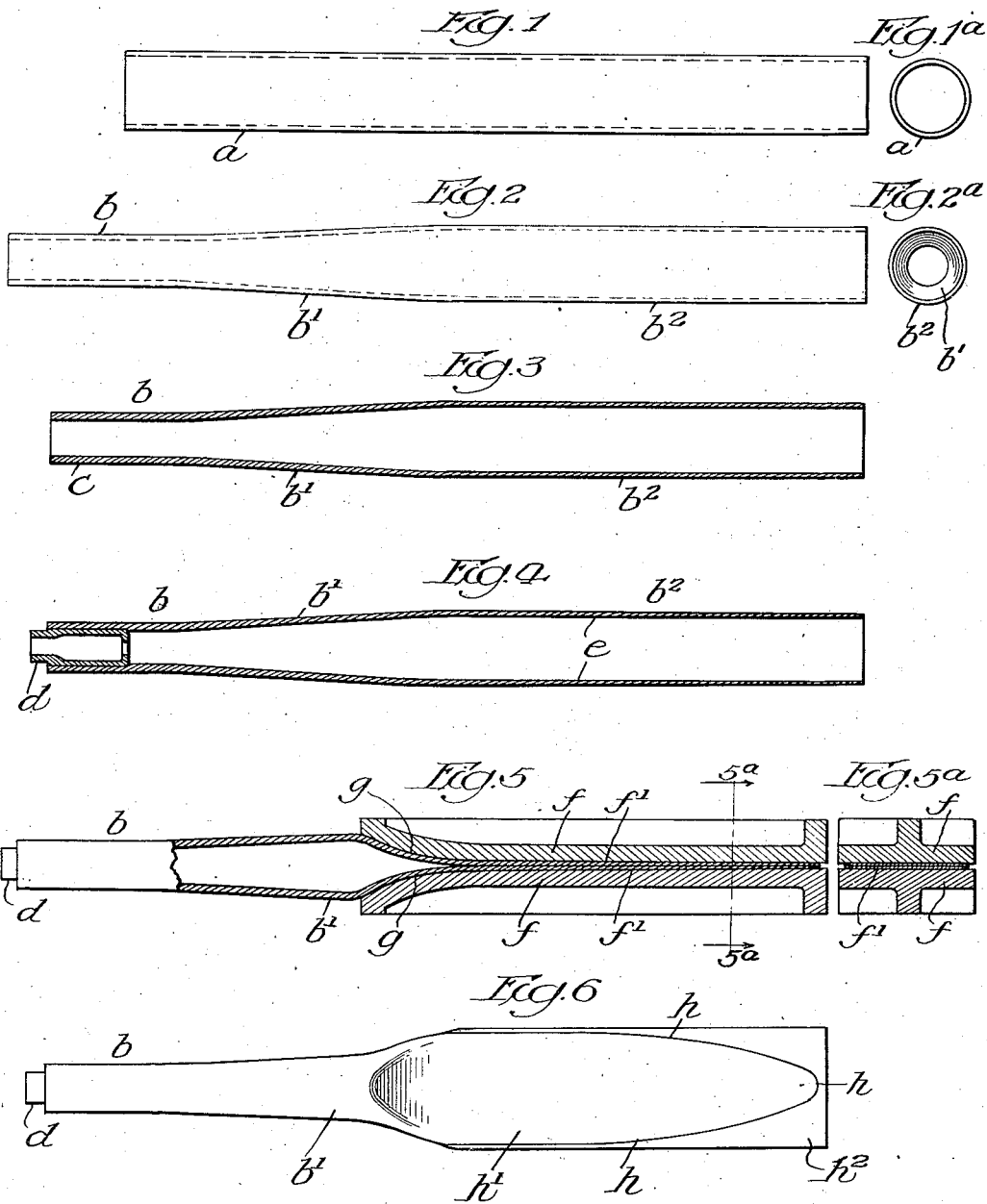

Drill bits of this type are operated with a rapid reciprocating movement induced by successive blows of an air hammer, and at the same time are rotated slowly about their longitudinal axis, to present a new surface at each blow. The apex of the curved face 15 is positioned approximately at the central axis of the bit, and I prefer to position the teeth so that one tooth lies at the center of said curved face, as shown. As the bit rotates, this central tooth of the curved face cuts in a series of lines radiating outwardly from the center of the hole, as shown at 25 in Fig. 4, so that no central core is left to interfere with the free scavenging of chips or to retard the speed of penetration, and the hole is left with a smooth flat bottom. The remaining teeth of the curved face, assisted by the teeth of the off-center straight face, cut the outer regions of the hole, the teeth of the one face following individually in the path of those of the other face so as to produce a series of concentric, annular incisions extending from the area cut out by the said central tooth of the curved face to the periphery of the hole, and to remove the material by making a congeries of crisscrossed cuts, as shown at 26. Fig. 4 represents the figure cut by the bit, showing the approximate relative position of the impressions left by the teeth after it